May 7, 1968 R. P. FELGAR ET AL 3,381,898
THERMAL SHOCK RESISTANT ROCKET NOZZLE INSERT
Filed Dec. 21, 1964
Fig. 1.
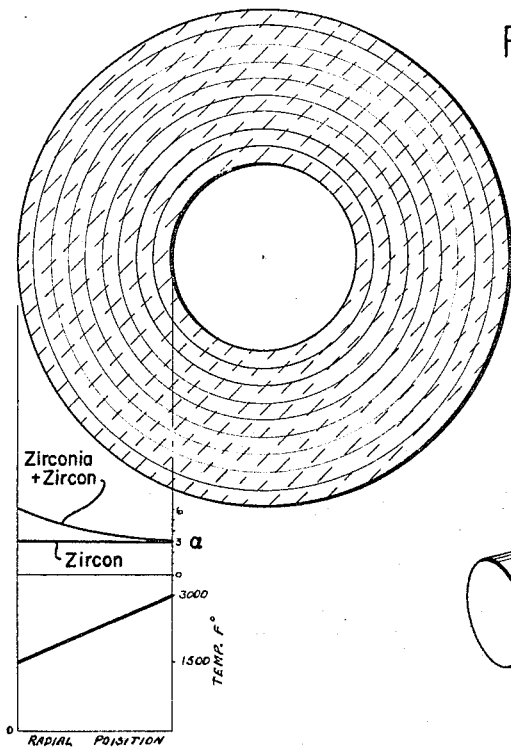
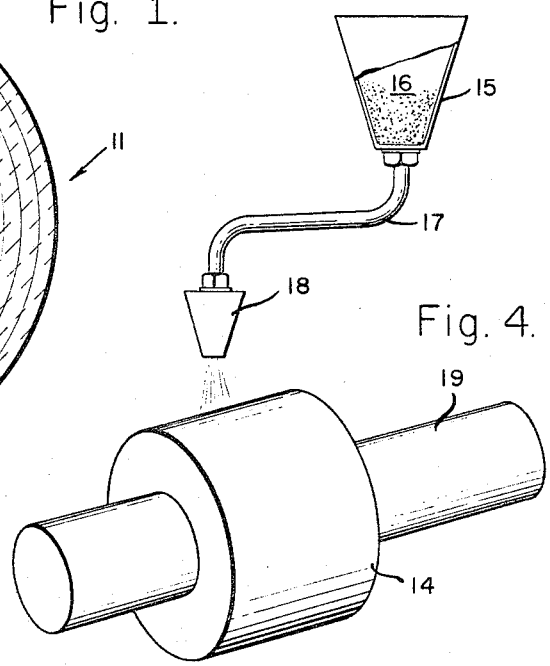
Fig. 4.
Fig. 2.
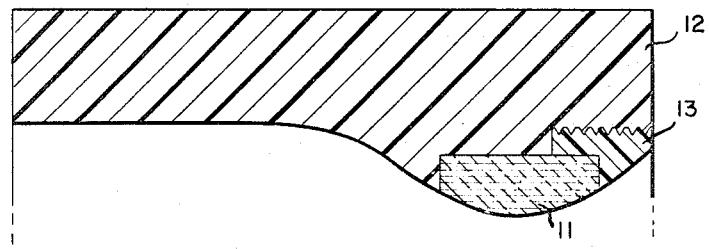
Fig. 3.
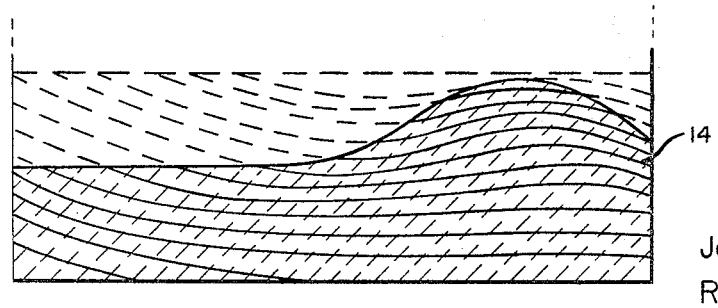
Jack R. Bohn,
Robert P. Felgar,
INVENTORS.
BY.
E. Hayward Marshall
AGENT.

United States Patent Office 3,381,898
Patented May 7, 1968

3,381,898
THERMAL SHOCK RESISTANT ROCKET NOZZLE INSERT
Robert P. Felgar, Santa Monica, and Jack R. Bohn, Torrance, Calif., assignors to TRW Inc., a corporation of Ohio
Filed Dec. 21, 1964, Ser. No. 420,038
5 Claims. (Cl. 239—265.11)

This invention relates to a thermal shock resistant structure and more particularly to an improved thermal shock resistant rocket nozzle or insert and the method of making same.

Rocket nozzles or inserts and similar structures which are subjected to steep temperature gradients have large thermal stresses induced which produce cracks and possibly catastrophic failures of the structure. Many attempts of various kinds have been made to overcome the problems associated with the construction of rocket nozzles, since the corrosive gases and high temperatures will normally erode or melt any metallic structures even those made out of the so-called refractory metals such as tungsten, molybdenum, columbium, tantalum and their alloys. One approach has been to utilize the refractory ceramic materials such as beryllia, alumina, zirconia and similar ceramic oxides, preferably blended with silica, as a liner or insert at the throat of the rocket nozzle to withstand the corrosion and high temperatures involved. However, the ceramic oxides and similar refractory ceramic materials are relatively brittle and tend to crack or disintegrate, when subjected to the large thermal stresses induced by the steep temperature gradients together with other mechanical loads due to pressure in the combustion chamber, as well as shock and vibration during operation.

One attempted solution is to provide a special cement for joining a ceramic liner to the metal outer walls of the nozzle, wherein the cement forms a cushion which helps to resist the thermal shock as well as mechanical shock and vibration. However, the variation in temperature throughout the thickness of the ceramic liner itself will induce stresses which can still cause it to crack and disintegrate.

Another approach to this problem is using a high temperature refractory coating on the base metal, such as the refractory ceramic oxides, alumina and zirconia, which have had limited success due to thermal shock, spalling, chipping and differential expansion effects. In order to overcome these effects, a plurality of coatings have been utilized wherein a mixture of metal and a refractory oxide has been applied in a plurality of thin sequential coatings which vary in composition from 100% metal to 100% refractory oxide. However, this method cannot be utilized to form relatively thick rocket nozzles or inserts of a refractory ceramic material mounted in a cylindrical body formed for example of silica and a phenolic resin or a similar ablative material. Furthermore, the thin refractory layer does not adequately protect the metal against the extremely high temperatures involved, since the layer is too thin to reduce the temperature of the base metal substantially, and some of the refractory ceramic materials will withstand much higher temperatures than the refractory metals, as well as withstanding the corrosive action of the combustion gases.

Briefly stated, one preferred embodiment of the present invention consists essentially of a rocket nozzle, or an insert for a rocket nozzle, formed from a mixture of two or more different refractory ceramic materials having significantly different coefficients of thermal expansion with the proportions of at least two of the materials varying in both the radial and/or the axial direction in such a manner, that the coefficient of thermal expansion varies in accordance with the particular geometry of the rocket nozzle and the particular thermal gradients experienced during operation thereof, so that the product of the coefficient of thermal expansion and temperature is a constant throughout the rocket nozzle or insert.

While the invention is described herein with reference to a rocket nozzle or insert therefor, it will be apparent that any article which is subjected to extremely high temperatures wtih very steep temperature gradients throughout the thickness or length of the article may be made in the same manner. Furthermore, while the invention is particularly adaptable to articles of this nature formed of a mixture of refractory ceramic materials, it is equally applicable to combinations of refractory metals or refractory carbides which may be mixed to vary the coefficient of expansion throughout the body of the article.

While the resulting article, such as a rocket nozzle or insert, formed in accordance with the present invention will be an integral structure substantially homogeneous throughout, except for the variation in proportions of the ingredients and the coefficient of thermal expansion, the article may be considered for example as a hollow cylinder which is built up by laying down a plurality of successive layers having preselected proportions of the two materials. These proportions may be made to vary in both the radial and/or the axial directions in such a manner as to obtain the desired variation of coefficient of thermal expansion. For example, zirconia and silica might be used for a ceramic rocket nozzle, and the inside surface would be predominantly silica and the outside surface would be predominantly zirconia. The same basic approach would be equally applicable using refractory carbides and/or refractory metals for rocket nozzle inserts particularly at the throat of the rocket nozzle, where the temperatures are highest and the corrosive and erosive effects of the combustion gases at high velocity are most deleterious to the exposed material at the surface, as well as applying extremely high thermal and mechanical stresses throughout the body of the rocket nozzle.

While numerous techniques and processes which are basically standard and conventional may be utilized for fabricating the insert, the novel method in accordance with the present invention involves the variation of the composition of the material as the article is formed in accordance with the temperature gradients in three dimensions.

For example, the rocket nozzle or insert may be formed by processes such as powder pressing, extrusion, slip casting and plasma spraying, which would be applicable for either refractory ceramics, carbides or metals with some conventional means for varying the composition or relative proportions or two or more ingredients of the mixture during the formation of the article. Normally, the articles as initially formed would be sintered at relatively high temperatures in a furnace or heat treated and annealed to form a substantially homogeneous integral structure which would have no stratification or distinct superimposed layers of material.

One example of a method of forming a rocket nozzle insert in accordance with the present invention is by means of plasma spraying or an arc torch, wherein a mixture of powdered ceramic material, such as a mixture of zirconia and silica, is heated to a high temperature and impinges or sprays on a rotating mandrel which forms the finished article. As the mixture is sprayed on the mandrel, the concentration of the ingredients of the mixture is varied so that the initial layers subjected to extremely high temperatures would be predominantly silica having a relatively low coefficient of expansion. As the part takes shape, the concentration of the material, such as zirconia, having a higher coefficient of thermal expansion is increased so that the outer layer would be predominantly zirconia. The mandrel would be removed subsequently by chemical or mechanical means after the desired shape has been achieved, and the article may then be heat treated to consolidate the material.

The article may also be formed by the process of soft plastic forming with the refractory materials being mixed in the form of a dry powder, or by slip casting with a thick fluid or liquid suspension of the ceramic particles. In this case, the article would be sintered or fired in a kiln and then subsequently machined to the exact shape desired after forming.

One object of the present invention is to provide an article formed of refractory material which will withstand the large thermal stresses, as well as the mechanical stresses, when subjected to extremely high temperatures with steep temperature gradients throughout the thickness and length of the article.

Another object of the present invention is to provide an improved rocket nozzle or rocket nozzle insert, wherein the coefficient of thermal expansion is varied throughout the length and thickness by varying the proportions of two or more of the constituent materials in such a manner that the product of the coefficient of thermal expansion and temperature is substantially the same at any point in the rocket nozzle or insert.

A further object of the present invention is to provide a rocket nozzle or a rocket nozzle insert, which can be utilized with the new and exotic, solid and liquid, rocket fuels producing higher flame temperatures and specific impulse, but which cannot be utilized with conventional rocket nozzle construction due to the temperature limitations of conventional materials and designs.

Other objects and many of the attendant advantages of the present invention will be readily appreciated as the same becomes better understood by reference to the following detailed description when considered with the accompanying drawings wherein:

FIGURE 1 is a transverse sectional view through one preferred embodiment of the present invention;

FIGURE 2 is a longitudinal half sectional view taken through a rocket nozzle with a rocket nozzle insert made in accordance with the present invention and showing the isotherms throughout the insert for one particular mode of operation;

FIGURE 3 is a longitudinal half sectional view through another embodiment of the present invention, wherein the entire rocket nozzle is formed in accordance with the present invention, and the isotherms are shown indicating the points of substantially uniform temperature during normal operation where the mixture of refractory materials has substantially the same coefficient of expansion; and FIGURE 4 is a perspective schematic view illustrating one manner in which the method of the present invention can be utilized to form a thermal shock resistant rocket nozzle or insert.

Referring now to the drawings in detail and more particularly to FIGURE 1, a rocket nozzle insert is shown in transverse sectional view with circular isotherms shown in light lines to indicate points of equal temperature during normal operation of the rocket nozzle, as well as points where the percentage of the ingredients in the mixture forming the rocket nozzle are substantially the same. However, these light circular lines do not indicate laminations or stratification of the material with the same composition throughout the layer, since the composition will vary in its percentage of the two ingredients throughout the thickness and length of the rocket nozzle insert.

In the longitudinal half sectional view of FIGURE 2, the rocket nozzle has a substantially cylindrical body 12 which may be formed of a suitable ablative material, such as a mixture of silica and phenolic resin, which supports the nozzle insert 11 shown here on a somewhat smaller scale. The insert 11 is held in position in the rocket nozzle body 12 by means of the threaded plug 13 which may be formed of the same material as the body 12.

Here again the light lines extending longitudinally or axially throughout the insert 11 are isotherms indicating points of equal temperature in an axial direction, and these points would also have substantially the same composition or percentage mixture of the two or more ingredients, so that the cofficient of thermal expansion would be the same along these lines.

In the longitudinal half section of FIGURE 3, a complete rocket nozzle formed of a mixture of refractory materials is shown with the resulting cylindrical body 14 having a contoured inner surface machined from a cylindrical body with the portions removed indicated in dotted line.

In this embodiment, the cylindrical body might be built up on a cylindrical mandrel in the manner illustrated in FIGURE 4 with a hopper 15 containing a powdered mixture 16 consisting of zirconia and silica. The mixture is fed through a conduit 17 to a plasma spray gun 18 or a similar means for impinging or spraying the mixture in a molten state on the cylindrical mandrel 19.

The powdered mixture 16 in the hopper 15 would have a high content of silica and a lower percentage of zirconia in the bottom of the hopper 15, and the mixture would gradually vary to a composition at the top of the hopper having a relatively high perecentage of zirconia and a low percentage of silica. The mixture would be varied as continuously as possible throughout the hopper, so that the mixture would vary gradually as the successive layers are sprayed on the mandrel 19 to build up the cylindrical body 14.

The isotherms in FIGURE 3 have been continued to the initial inner cylindrical surface which would first be formed on the mandrel 19 to indicate the manner in which the layers might be sprayed on the mandrel 19 to build up the cylindrical body.

The inner portion would be machined or ground away, after the mandrel 19 has been removed to provide the contour shown which is required on the inner surface of a rocket nozzle, the portion removed being shown in dotted lines.

The temperatures indicated for the different isotherms are merely typical of one particular mode of operation of a rocket nozzle using a specific monopropellant or combination of propellants, which may be either solid or liquid, and obviously these temperatures would vary for each particular application and design of a specific rocket nozzle utilizing various types of solid and liquid propellants.

One specific example will be given of a mixture which may be utilized in accordance with the present invention giving the percentage mixture with the resulting coefficient of expansion for the temperature at a number of different isotherms in accordance with the following equation.

$$\alpha = \frac{a_1 K_1 F_1/\rho_1 + a_2 K_2 F_2/\rho_2}{F_1/\rho_1 + F_2/\rho_2}$$

where $\alpha$ = thermal expansion coefficient for a composite
$a_1$ = thermal expansion coefficient of zircon, $3 \times 10^{-6}$ in./in. ° F.
$a_2$ = thermal expansion coefficient of zirconia, $6 \times 10^{-6}$ in./in. ° F.
$\rho_1$ = density of zirconia, 0.16 lb./in.$^3$
$\rho_2$ = density of zirconia, 0.203 lb./in.$^3$
$F_1$ = weight fraction of zircon
$F_2$ = weight fraction of zirconia
$K_1$ = bulk modulus of zircon
$K_2$ = bulk modulus of zirconia
$K_1 \simeq K_2$ and $F_1 + F_2 = 1$ Thus, $$\alpha = \frac{a_1 F_1/\rho_1 + a_2(1-F_1)/\rho_2}{F_1/\rho_1 + (1-F_1)/\rho_2}$$

The following tabulation was based on this equation, assuming α to be independent of temperature.

VARIATION OF THERMAL EXPANSION COEFFICIENT WITH COMPOSITION OF ZIRCON-ZIRCONIA COMPOSITE

| Radial Position | Temp., °F. | $\alpha \times 10^{-6}$ in./in., °F. | $\alpha \Delta T \times 10^{-3}$ in./in. | $F_1$ Weight Fraction of Zircon | $F_2$ Weight Fraction of Zirconia |
| --- | --- | --- | --- | --- | --- |
| 1 | 3,000 | 3.00 | 9.0 | 1.00 | 0 |
| 2 | 2,625 | 3.43 | 9.0 | 0.82 | 0.18 |
| 3 | 2,250 | 4.00 | 9.0 | 0.61 | 0.39 |
| 4 | 1,875 | 4.80 | 9.0 | 0.34 | 0.66 |
| 5 | 1,500 | 6.00 | 9.0 | 0 | 1.00 |

*Comparison of thermal stresses in tailored and untailored materials for an assumed temperature profile*

To illustrate the benefit which can be derived from the tailored alpha insert design for a particular thermal gradient, the following comparison is made for tailored and untailored materials. The insert consists of a hollow cylinder such as that illustrated in FIGURE 1, which may be inserted in a rocket nozzle, as shown in FIGURE 2. The cylinder may be made of either pure zircon or graded zircon. The graded material varies from zircon at the I.D. to zirconia at the O.D., and the variation in composition across the wall is adjusted so that the product of the expansion coefficient and temperature are constant at all radial positions. The end point expansion coefficients are $3 \times 10^{-6}$ in./in. °F. (zircon) at the I.D. to $6 \times 10^{-6}$ (zirconia) at the O.D. For ungraded zircon the expansion coefficient remains constant at $3 \times 10^{-6}$ in./in. °F. across the wall.

The thermal properties for zircon and zirconia are very similar, and the graded composition would also be similar. Thus, one temperature profile is given to represent zircon, zirconia and the tailored combination. The temperature variation with radius is made linear for purposes of illustration. The temperature profile need not be linear, and similar benefit could be demonstrated for practically any thermal profile or geometry of interest. Actually, this example closely approximates the results from a one-dimensional heat transfer analysis for a practical situation for both zircon and zirconia.

If the height of the insert is small compared to the diameter, a condition plane stress exists, and circumferential stresses at the back side are the limiting stresses. There is assumed to be no mechanical interaction between the insert 11 and the cylindrical body 12 or plug 13. The circumferential stresses may be calculated from the following equation, assuming elastic materials behavior with no variation with temperature.

$$\sigma_{\theta_{r=b}} = \frac{2E}{b^2 - a^2} \int_a^b (\alpha T - \alpha_b T_b) r\, dr$$

where $\sigma_{\theta_{r=b}}$ = circumferential stress
$\alpha$ = thermal coefficient of expansion
$E$ = modulus of elasticity
$r$ = radius
$a$ = inside radius (0.50 in.)
$b$ = outside radius (0.75 in.)

For the linear temperature gradient of interest and a constant thermal expansion coefficient, integration of this equation yields $$\sigma_{\theta_{r=b}} = \alpha E \left[ \frac{2a+b}{3(a+b)} \right](T_a - T_b)$$
$$= 42{,}000 \text{ p.s.i.}$$

where $$T_a = 3000° \text{ F.}, \quad T_b = \frac{T_a}{2}$$

$a = 0.5$ in., $b = 0.75$, $E = 20 \times 10^6$ p.s.i.
$\alpha = 3.0 \times 10^{-6}$ in./in. °F.

For the tailored α material the solution may be rewritten as follows, and the calculated stress is zero.

$$\sigma_{\theta_{r=b}} = E\left[\frac{2a+b}{3(a+b)}\right](\alpha_a T_a - \alpha_b T_b)$$
$$= E\left[\frac{2a+b}{3(a+b)}\right]\left(3 \times 10^{-6} T_a - 6 \times 10^{-6} \frac{T_a}{2}\right)$$
$$= 0$$

The tensile strength for zircon for the temperature range of interest is approximately 15,000 p.s.i., which is considerably less than the 42,000 p.s.i. tensile stress computed for the ungraded insert. Consequently, the inner cylinder, if made of pure zircon, would fail in tension before the temperature gradient became as steep as the assumed temperature profile. The tailored material has no circumferential tensile stress at the back side or at any other radial station for this thermal gradient.

Obviously, for other thermal gradients which may be greater or less than the example cited, the resulting circumferential stresses can be larger in either tension or compression. Thus, a detailed analysis of all temperature profiles representative of a particular duty cycle must be made to insure that the maximum benefit is derived from the tailored α material. This procedure becomes a process of iteration in the analysis, design and materials fabrication.

The technique of tailoring materials properties to the environment offers the potential advantage of utilizing materials which have poor thermal shock resistance but are otherwise attractive for high temperature applications. The technique can be applied to all types of refractory metals, ceramics and composites, and may be extended to include an additional benefit from a controlled variation in modulus of elasticity with radius.

*Method*

One particular process has been illustrated in FIGURE 4 for carrying out the method and forming the article of the present invention. It will be apparent that many other conventional methods for forming articles out of refractory ceramic materials or from refractory carbides and metal may be utilized to carry out the basic concepts disclosed herein. For example, dry powder formed of ceramic, metallic or carbide material may be mixed in varying proportions and pressed in a mold, and then subsequently sintered or fired in a ceramic kiln, or heat treated and annealed to form a substantially homogeneous integral structure which would have no stratification or distinguishable superimposed layers of material.

Another method which could be utilized for forming an article, such as a rocket nozzle, particularly with a ceramic material, is the process of slip casting wherein a mold or body would be sequentially immersed in a thick liquid suspension of the ceramic materials with the mixture varied with each successive dipping until a body of substantial thickness is built up having the required characteristics. The molds in this type of process are usually relatively porous absorbant material, such as plaster of Paris, which will absorb the liquid suspending the ingredients and, after the article formed has dried thoroughly, it can be subjected to relatively high temperatures in a ceramic kiln for consolidation and fusing of the material into a solid integral structure which can subsequently be machined, ground or otherwise shaped to the desired shape required for a rocket nozzle or other structure which may be subjected to extremely high temperatures and very steep temperature gradients.

While the mixture of refractory materials is preferably varied continuously in both linear and transverse direction to provide an integral substantially homogeneous article, it may be expedient in some instances to build up a plurality of relatively thin layers, which are subsequently fused, fired or otherwise consolidated into an integral structure with each layer having a slightly different composition and a different coefficient of thermal expansion.

Obviously, many other modifications and variations of the present invention may be made within the scope of the following claims.

The embodiments of the invention in which an exclusive property or privilege is claimed are defined as follows:

1. A thermal shock resistant structure comprising:
   a body composed of a mixture or refractory ceramic materials,
   at least two of said materials having significantly different coefficients of thermal expansion,
   said body having a portion of substantial thickness subjected to extremely high operating temperatures on one surface thereof and substantially lower temperatures on the opposite surface thereof producing a steep temperature gradient through said portion, the percentage of each of said two materials in said mixture varying throughout said body in such a manner that the product of the coefficient of thermal expansion and the normal operating temperature is substantially equal at all points throughout said portion of said body.

2. A thermal shock resistant structure according to claim 1 in which said body comprises a hollow body of revolution.

3. A thermal shock resistant structure according to claim 1 in which said mixture is varied both radially and axially throughout said body.

4. A thermal shock resistant structure according to claim 1 in which one of said materials comprises zircon and another material comprises zirconia.

5. A thermal shock resistant structure according to claim 4 in which the percentage of zircon is greater at the portion of said body exposed to said high operating temperature than the portion exposed to said lower temperature.

References Cited
UNITED STATES PATENTS

| | | | |
|---|---|---|---|
| 2,431,327 | 11/1947 | Geiger | 106—44 |
| 2,706,382 | 4/1955 | Logan et al. | 239—265.11 |
| 2,987,874 | 6/1961 | Nicholson | 239—265.15 |

EVERETT W. KIRBY, *Primary Examiner.*